United States Patent
Li et al.

(10) Patent No.: US 11,865,643 B2
(45) Date of Patent: Jan. 9, 2024

(54) DRILLING DEVICE WITH CONTROLLABLE FEMTOSECOND LASER PROCESSING TAPER AND DRILLING PROCESS THEREOF

(71) Applicant: LYNCWELL INNOVATION INTELLIGENT SYSTEM (ZHEJIANG) CO., LTD., Wenzhou (CN)

(72) Inventors: Fengping Li, Wenzhou (CN); Guang Feng, Wenzhou (CN); Xiaogang Li, Wenzhou (CN); Guang Ma, Wenzhou (CN); Yao Xue, Wenzhou (CN); Rong Zhong, Wenzhou (CN); Dehua Zhu, Wenzhou (CN); Jihong Pang, Wenzhou (CN); Liqu Lin, Wenzhou (CN); Chengji Lu, Wenzhou (CN)

(73) Assignee: LYNCWELL INNOVATION INTELLIGENT SYSTEM (ZHEJIANG) CO., LTD., Wenzhou (CN)

(*) Notice: Subject to any disclaimer, the term of this patent is extended or adjusted under 35 U.S.C. 154(b) by 357 days.

(21) Appl. No.: 17/255,440

(22) PCT Filed: Apr. 9, 2020

(86) PCT No.: PCT/CN2020/083892
§ 371 (c)(1),
(2) Date: Dec. 23, 2020

(87) PCT Pub. No.: WO2021/036270
PCT Pub. Date: Mar. 4, 2021

(65) Prior Publication Data
US 2021/0323097 A1 Oct. 21, 2021

(30) Foreign Application Priority Data
Aug. 30, 2019 (CN) .................. 201910815402.X

(51) Int. Cl.
*B23K 26/382* (2014.01)
*B23K 26/06* (2014.01)

(52) U.S. Cl.
CPC ........ *B23K 26/382* (2015.10); *B23K 26/0643* (2013.01)

(58) Field of Classification Search
CPC ............ B23K 26/0624; B23K 26/0643; B23K 26/082; B23K 26/382; B23K 26/384; B23K 31/12
(Continued)

(56) References Cited

U.S. PATENT DOCUMENTS 4,822,974 A  4/1989 Leighton

FOREIGN PATENT DOCUMENTS

CN   204565419 U    8/2015
CN   105945422   *  9/2016
(Continued)

OTHER PUBLICATIONS

Nan-Nan Fan et al., Experimental study on stainless steel microhole trepanned by femtosecond laser, Laser & Infrared, Oct. 2016, pp. 1200-1205, vol. 46, No. 10.

*Primary Examiner* — Dana Ross
*Assistant Examiner* — Joseph W Iskra
(74) *Attorney, Agent, or Firm* — Bayramoglu Law Offices LLC

(57) ABSTRACT

A drilling device with a controllable femtosecond laser processing taper includes a femtosecond laser and a precision motion table. A support mechanism is provided along the central axis of the precision motion table, and a clamp is provided on the top of the support mechanism. The output end of the femtosecond laser is provided with a beam expander. The output end of the beam expander is provided with a reflection mirror. The output end of the reflection
(Continued)

mirror is provided with a beam scanning module. The output end of the beam scanning module is provided with a semi-focusing mirror. The output end of the semi-focusing mirror is provided with a semi-transmissive reflection mirror arranged at 45 degrees. The reflection output end of the semi-transmissive reflection mirror is provided with a high-precision three-dimensional on-line monitoring module, and the transmission output end of the semi-transmissive reflection mirror faces the clamp.

10 Claims, 2 Drawing Sheets

(58) Field of Classification Search
USPC .................................................. 219/121.71
See application file for complete search history.

(56) References Cited

FOREIGN PATENT DOCUMENTS

| CN | 107262943 | A | 10/2017 |
|----|-----------|---|---------|
| CN | 108067730 | * | 1/2018  |
| CN | 109702326 | * | 5/2019  |
| CN | 109702326 | A | 5/2019  |
| CN | 110405368 | A | 11/2019 |

* cited by examiner

Upright tapered hole   Inverted tapered hole

DRILLING DEVICE WITH CONTROLLABLE FEMTOSECOND LASER PROCESSING TAPER AND DRILLING PROCESS THEREOF

CROSS REFERENCE TO THE RELATED APPLICATIONS

This application is the national phase entry of International Application No. PCT/CN2020/083892, filed on Apr. 9, 2020, which is based upon and claims priority to Chinese Patent Application No. 201910815402.X, filed on Aug. 30, 2019, the entire contents of which are incorporated herein by reference.

TECHNICAL FIELD

The present invention relates to the field of laser processing, and particularly relates to a drilling device with a controllable femtosecond laser processing taper and a drilling process thereof.

BACKGROUND

In the automobile industry, the fuel spray hole in the fuel atomization structure is an important factor that directly affects the combustion performance of internal combustion engines. The geometric precision of the spray hole includes a position, a roundness, a surface roughness of the hole wall, and a relative angle of the hole. As another example, the nozzle taper of a fuel spray nozzle also has an important influence on fuel atomization, and highly atomized gasoline has a high combustion efficiency, thereby saving the fuel. In addition, aircraft engine or turbine blades rotate at a high speed in high-temperature gas, bearing a gas load, a mass load and a heat load and have to perform in less than optimal environmental conditions. Film holes on the blade body perform in a high-temperature region, and the high-temperature airflow forms a fast-flowing low-temperature air film on the surface of the blade body through the air film holes. This isolates or partitions the high-temperature gas relative to the blade so as to provide cooling protection for the blade. Producing a recast layer during manufacture of the air film hole is relatively simple, and the quality of the recast layer has significant influence on the working reliability and serve life of the blade.

At present, there are four main methods used for processing tapered holes: (i) manual drilling on a frequency-conversion or pneumatic high-speed table; (ii) drilling with a numerically-controlled high-speed multi-axis drilling machine; (iii) processing the spray hole with an electric spark spray hole machine tool; and (iv) processing the spray hole with a laser drilling system. However, these methods have many disadvantages. After processing with the drilling process, a burr of the spray hole is relatively larger, surface quality is not satisfactory, and the processing of small aperture and large depth-to-diameter ratio holes is limited. As for the electric spark process, the processing aperture is limited by an electrode wire, and processing an inverted tapered hole requires adding a special mechanism and errors inevitably result. The laser process has advantages such as a high processing efficiency, high precision of limit aperture, low cost and no material selectivity.

Conventional laser processing tapered hole devices include a deflection motor, a spindle motor, and a clamp. The basic principle of this method is that after the working table is deflected to form a proper angle between the laser and the surface of a workpiece, the spindle drives the workpiece to rotate, and the tapered hole is processed under the action of the laser. In the aspect of the processing method, a coordinate position of the workpiece under a laser control platform is calculated by adopting trial processing, measuring a radius of the processed concentric circle and combining a distance of a laser spot. Once the position has been compensated for, the workpiece is processed. In the aspect of controlling the cutting speed, the laser performs high-speed self-rotation to achieve the required cutting speed, thereby reducing the requirement for the rotation speed of the spindle motor.

The above laser processing method does not mention the method for processing the holes with a large depth-to-diameter ratio. Meanwhile, using the rotation of the rotating motor to perform the tapered hole processing may cause processing and positioning problems. The mechanical vibration during the processing cannot be avoided although the processing can be performed after the position is compensated, and there are problems of poor drilling quality and insufficient precision due to the lack of an ability to perform real-time checking and adjustment.

SUMMARY

The purpose of the present invention is to provide a drilling device with a controllable femtosecond laser processing taper and a drilling process thereof. The present invention performs real-time detection for the processing procedure through a high-precision three-dimensional on-line monitoring module, thereby effectively adjusting the errors generated in the processing procedure, and improving processing quality and precision. In addition, the present invention has the advantages of high processing precision and improved stability.

The technical solution of the present invention is as follows: a drilling device with a controllable femtosecond laser processing taper includes a femtosecond laser and a precision motion table. A support mechanism is provided along the central axis of the precision motion table, and a clamp is provided on the top of the support mechanism. The output end of the femtosecond laser is provided with a beam expander. The output end of the beam expander is provided with a reflection mirror. The output end of the reflection mirror is provided with a beam scanning module. The output end of the beam scanning module is provided with a semi-focusing mirror. The output end of the semi-focusing mirror is provided with a semi-transmissive reflection mirror arranged at 45 degrees. The reflection output end of the semi-transmissive reflection mirror is provided with a high-precision three-dimensional on-line monitoring module, and the transmission output end of the semi-transmissive reflection mirror faces the clamp on the precision motion table.

In the drilling device with the controllable femtosecond laser processing taper mentioned above, the beam scanning module includes a displacement optical wedge group and a deflection optical wedge group. The displacement optical wedge group includes a first displacement optical wedge and a second displacement optical wedge. The first displacement optical wedge and the second displacement optical wedge have an identical wedge angle and are linked through an vertical linear motion mechanism. The deflection optical wedge group includes a first deflection optical wedge and a second deflection optical wedge. The first deflection optical wedge and the second deflection optical wedge have an identical wedge angle and are equidistantly distributed on both sides of the displacement optical wedge group through a rotating mechanism.

In the drilling device with the controllable femtosecond laser processing taper mentioned above, the femtosecond laser has a center wavelength of an optical pulse approaching to 1053 nm and a pulse width of 20 fs.

In the drilling device with the controllable femtosecond laser processing taper mentioned above, the beam scanning module adopts a fully closed loop control to control a deflection angle at a precision less than and equal to 0.1 degrees.

In the drilling device with the controllable femtosecond laser processing taper mentioned above, the precision motion table is a five-axis motion table, and has a positioning precision of 0.01 mm and a repeated positioning precision of 5 μm.

In the drilling device with the controllable femtosecond laser processing taper mentioned above, the clamp includes a positioning clamp block arranged on the top end of the support mechanism. A moving clamp block is fixed on the positioning clamp block through an adjusting bolt. The moving clamp block and the positioning clamp block are provided with slots that are oppositely arranged and stepwise distributed.

A drilling process with a controllable femtosecond laser processing taper includes: activating the femtosecond laser to emit a beam; expanding the beam through the beam expander to reach a required diameter for processing, wherein the beam enters the reflection mirror; reflecting the beam to the beam scanning module through the reflection mirror to generate a spiral beam under an action of a displacement optical wedge group and a deflection optical wedge group, wherein the beam enters a semi-transmissive reflection mirror through a semi-focusing mirror, and the reflected beam enters the high-precision three-dimensional on-line monitoring module under an action of the semi-transmissive reflection mirror; using a beam transmitted through the semi-transmissive reflection mirror to perform laser drilling for a sample fixed on the clamp; performing detection in real time through the high-precision three-dimensional on-line monitoring module; and adjusting an error generated in a processing procedure to improve a processing precision.

Compared with the prior art, the present invention has the following advantages:

1. The present invention performs real-time detection for the processing procedure through a high-precision three-dimensional on-line monitoring module, thereby effectively adjusting the errors generated in the processing procedure, and further improving the processing quality and precision. In addition, the present invention has advantages of a high processing precision and a high stability.

2. The beam scanning module provided in the present invention can implement the processing of any tapered hole angle by changing a scanning path. Specifically, the beam scanning module includes a displacement optical wedge group and a deflection optical wedge group, the displacement optical wedge group includes a first displacement optical wedge and a second displacement optical wedge, and the first displacement optical wedge and the second displacement optical wedge have an identical wedge angle and are linked through a vertical linear motion mechanism. The deflection optical wedge group includes a first deflection optical wedge and a second deflection optical wedge, and the first deflection optical wedge and the second deflection optical wedge have an identical wedge angle and are equidistantly distributed on both sides of the displacement optical wedge group through a rotating mechanism. In the present invention, the beam path is changed by controlling the first displacement optical wedge, the second displacement optical wedge, the first deflection optical wedge and the second deflection optical wedge, so that the processing of any tapered hole angle can be implemented by changing the scanning path.

Figure 1:
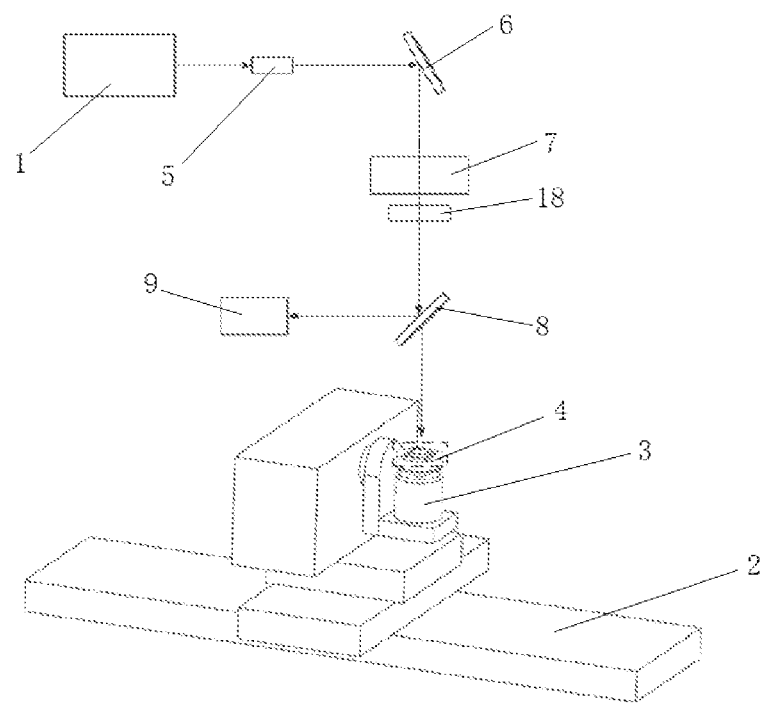
FIG. 1 is a schematic diagram of the structure of the present invention.

In the figures: 1. femtosecond laser; 2. precision motion table; 3. support mechanism; 4. clamp; 5. beam expander 6. reflection mirror; 7. beam scanning module; 8. semi-transmissive reflection mirror; 9. high-precision three-dimensional on-line monitoring module; 10. first displacement optical wedge; 11. second displacement optical wedge; 12. first deflection optical wedge; 13. second deflection optical wedge; 14. positioning clamp block; 15. adjusting bolt; 16. moving clamp block; 17. slot; and 18. semi-focusing mirror.

DETAILED DESCRIPTION OF THE EMBODIMENTS

The present invention will be further explained below in conjunction with the drawings and embodiments which are not taken as bases for limiting the present invention.

Embodiment: as shown in FIGS. 1-4, a drilling device with a controllable femtosecond laser processing taper includes the femtosecond laser 1 and the precision motion table 2. The support mechanism 3 is provided along the central axis of the precision motion table 2, and the clamp 4 is provided on the top of the support mechanism 3. The output end of the femtosecond laser 1 is provided with the beam expander 5. The output end of the beam expander 5 is provided with the reflection mirror 6. The output end of the reflection mirror 6 is provided with the beam scanning module 7. The output end of the beam scanning module 7 is provided with the semi-focusing mirror 18. The output end of the semi-focusing mirror 18 is provided with the semi-transmissive reflection mirror 8 arranged at 45 degrees. The reflection output end of the semi-transmissive reflection mirror 8 is provided with the high-precision three-dimensional on-line monitoring module 9, and the transmission output end of the semi-transmissive reflection mirror 8 faces the clamp 4 on the precision motion table 2. The present invention performs real-time detection for an offset amount of the beam during the processing through the high-precision three-dimensional on-line monitoring module 9, thereby effectively adjusting the errors generated during the processing, and effectively improving the processing quality and precision. In addition, the present invention has advantages of a high processing precision and a high stability.

Figure 2:
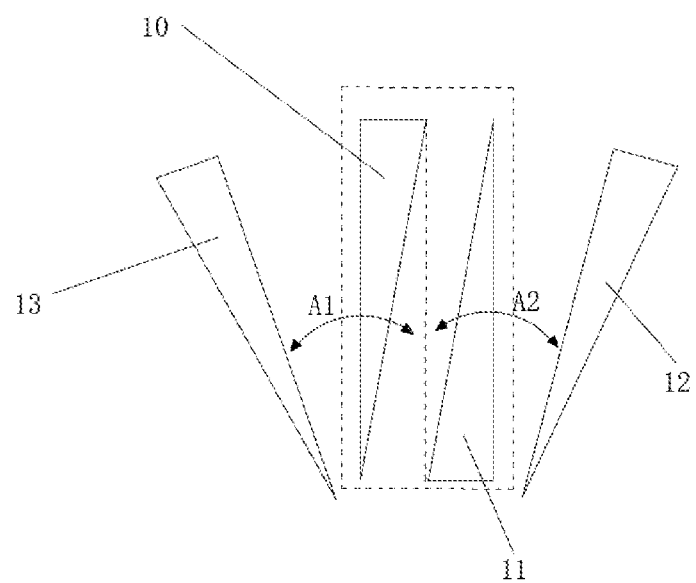
FIG. 2 is a schematic diagram of the structure of a beam scanning module.

As shown in FIG. 2, the beam scanning module 7 includes a displacement optical wedge group and a deflection optical wedge group. The displacement optical wedge group includes the first displacement optical wedge 10 and the second displacement optical wedge 11, and the first displacement optical wedge 10 and the second displacement optical wedge 11 have an identical wedge angle and are linked through a vertical linear motion mechanism. The deflection optical wedge group includes the first deflection optical wedge 12 and the second deflection optical wedge 13, and the first deflection optical wedge 12 and the second deflection optical wedge 13 have an identical wedge angle and are equidistantly distributed on both sides of the displacement optical wedge group through a rotating mechanism. In the present invention, the beam path is changed by controlling the first displacement optical wedge 10, the second displacement optical wedge 11, the first deflection optical wedge 12 and the second deflection optical wedge 13, so that the processing of any tapered hole angle can be implemented by changing the scanning path.

Figure 3:
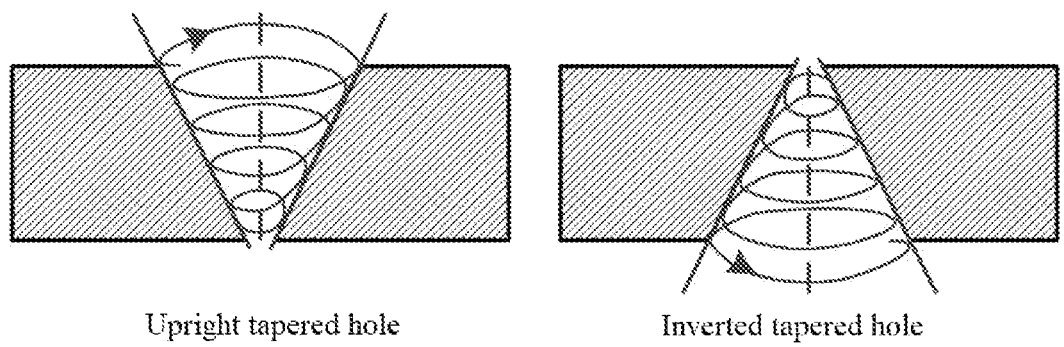
FIG. 3 is a drilling diagram of an upright tapered hole and an inverted tapered hole according to an embodiment.

As shown in FIG. 3, in order to process the tapered hole, it is necessary to control the rotating and scanning paths by the deflection optical wedge group and the displacement optical wedge group to process the upright/inverted tapered holes. When the translation direction of an incident beam translates is just opposite to the deflection direction of the beam, and the translation distance of the beam is at least greater than half of a diameter of the beam, that is, the entire beam translates to the other side of an optical axis, an edge of the beam is ensured to be at least parallel with the axis of the hole or greater than 0 degrees in a direction of light propagation. Then, the beam rotates around the optical axis at a certain speed. In order to process the upright tapered hole, a radius of the rotating beam is relatively large initially. After feeding layer by layer, the radius of the rotating beam gradually decreases. On the contrary, if it is desired to process the inverted tapered hole, the radius of the rotating beam is relatively small initially, and after feeding layer by layer, the radius of the rotating beam gradually increases. In this way, the problem that the edge blocks light during the deep processing of the beam is optimally resolved.

FIG. 3 shows a relative relationship between the deflection optical wedge group and the displacement optical wedge group in the beam scanning module 7. The beam scanning module performs the scanning of a circular track through the cooperative rotations of the first deflection optical wedge 12, the second deflection optical wedge 13, the first displacement optical wedge 10 and the second displacement optical wedge 11. A relative phase relationship between the deflection optical wedge group and the displacement optical wedge group controls a radius of the circular track. When the phase relationship changes according to a certain rule, circular spiral scanning of the corresponding track distribution can be implemented.

In the actual scanning procedure, a rotation phase of the displacement optical wedge group is taken as a reference. The first deflection optical wedge 12 and the second deflection optical wedge 13 are always equidistantly distributed on both sides of the displacement optical wedge group, and form certain equal phase angles with the displacement optical wedge group (that is, A1 is always equal to A2 in FIG. 2) to perform the cooperative rotations. When the phase relationship between the deflection optical wedge group and the displacement optical wedge group changes according to a certain rule, the circular spiral scanning of the corresponding track distribution can be implemented.

Specifically, the coaxial charge coupled device (CCD) in the high-precision three-dimensional on-line monitoring module 9 is perpendicular to the upper end of an optical path, and the concentricity is ensured to be within 0.005 mm by adjusting a center of a vertical beam and a cross center of the CCD. Before each processing and during the processing, the processing position can be ensured by comparing the cross center of the CCD with the actual processing position of a sample.

The high-precision three-dimensional on-line monitoring module 9 employs a laser three-dimensional measurement technology to implement laser six-point positioning of complex curved surfaces, which can accurately position complex three-dimensional components and complex curved surfaces during the processing, avoid the errors of repeated clamping, and greatly improve the alignment efficiency.

The high-precision three-dimensional on-line monitoring module 9 adopts a back wall protection technology, and mainly adds the semi-transmissive reflection mirror 8 in the main optical path to image the change of a micro-hole of the focusing mirror on the CCD during the processing, wherein the CCD image alignment system reads a position of a spot formed by the laser beam on a spot calibration plate, calculates an offset amount of the spot relative to a calibration mark point, performs real-time detection for the drilling process, and uses an image recognition software to perform automatic interpretation, so as to achieve on-line automatic discrimination of penetration detection.

The femtosecond laser 1 has a center wavelength of an optical pulse approaching to 1053 nm and a pulse width of 20 fs.

The precision motion table 2 is a five-axis motion table, and has a positioning precision of 0.01 mm and a repeated positioning precision of 5 μm.

Figure 4:
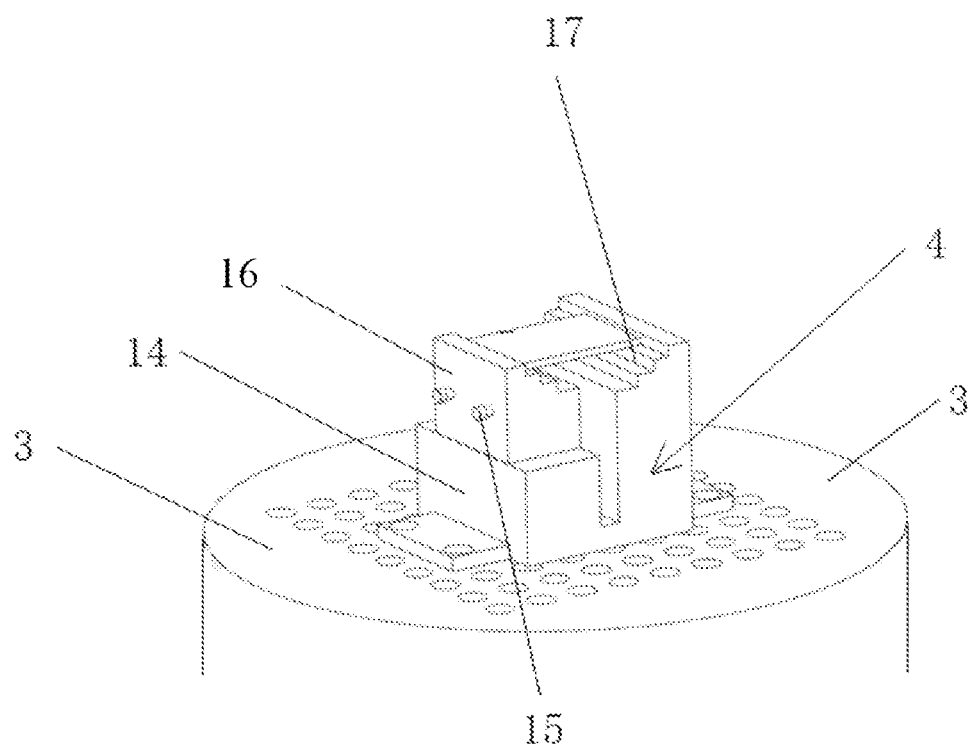
FIG. 4 is a schematic diagram of the structure of a clamp.

As shown in FIG. 4, the clamp 4 includes the positioning clamp block 14 arranged on the top end of the support mechanism 3. The moving clamp block 16 is fixed on the positioning clamp block 14 through the adjusting bolt 15. The moving clamp block 16 and the positioning clamp block 14 are provided with slots 17 that are oppositely arranged and stepwise distributed.

A drilling process with a controllable femtosecond laser processing taper is provided. Specifically, the femtosecond laser is activated to emit a beam. The beam is expanded through the beam expander to reach the required diameter for processing and then enters the reflection mirror. The reflection mirror reflects the beam to the beam scanning module to generate a spiral beam under the action of the displacement optical wedge group and the deflection optical wedge group. Then, the beam enters the semi-transmissive reflection mirror through the semi-focusing mirror, and the reflected beam enters the high-precision three-dimensional on-line monitoring module under the action of the semi-transmissive reflection mirror. The beam transmitted through the semi-transmissive reflection mirror is configured to perform laser drilling for the sample fixed on the clamp. Meanwhile, the high-precision three-dimensional on-line monitoring module is configured to detect an offset amount of the beam in real time, and perform a corresponding adjustment, thereby ensuring the processing quality.

What is claimed is:

1. A drilling device with a controllable femtosecond laser processing taper, comprising a femtosecond laser and a precision motion table; wherein, a support mechanism is provided along a central axis of the precision motion table, and a clamp is provided on a top of the support mechanism;

an output end of the femtosecond laser is provided with a beam expander; an output end of the beam expander is provided with a reflection mirror;

an output end of the reflection mirror is provided with a beam scanning module;

an output end of the beam scanning module is provided with a semi-focusing mirror;

an output end of the semi-focusing mirror is provided with a semi-transmissive reflection mirror arranged at 45 degrees;

a reflection output end of the semi-transmissive reflection mirror is provided with a high-precision three-dimensional on-line monitoring module, and a transmission output end of the semi-transmissive reflection mirror faces the clamp on the precision motion table, wherein the beam scanning module comprises a displacement optical wedge group and a deflection optical wedge group;

wherein, the displacement optical wedge group comprises a first displacement optical wedge and a second displacement optical wedge, and the first displacement optical wedge and the second displacement optical wedge have an identical wedge angle and are linked through an vertical linear motion mechanism;

wherein, the deflection optical wedge group comprises a first deflection optical wedge and a second deflection optical wedge, and the first deflection optical wedge and the second deflection optical wedge have an identical wedge angle and are equidistantly distributed on both sides of the displacement optical wedge group through a rotating mechanism.

2. The drilling device of claim 1, wherein the femtosecond laser has a center wavelength of an optical pulse approaching to 1053 nm and a pulse width of 20 fs.

3. The drilling device of claim 1, wherein the beam scanning module adopts a fully closed loop control to control a deflection angle at a precision less than and equal to 0.1 degrees.

4. A drilling device with a controllable femtosecond laser processing taper, comprising a femtosecond laser and a precision motion table; wherein, a support mechanism is provided along a central axis of the precision motion table, and a clamp is provided on a top of the support mechanism;

an output end of the femtosecond laser is provided with a beam expander; an output end of the beam expander is provided with a reflection mirror;

an output end of the reflection mirror is provided with a beam scanning module;

an output end of the beam scanning module is provided with a semi-focusing mirror;

an output end of the semi-focusing mirror is provided with a semi-transmissive reflection mirror arranged at 45 degrees;

a reflection output end of the semi-transmissive reflection mirror is provided with a high-precision three-dimensional on-line monitoring module, and a transmission output end of the semi-transmissive reflection mirror faces the clamp on the precision motion table, wherein the precision motion table is a five-axis motion table, and the precision motion table has a positioning precision of 0.01 mm and a repeated positioning precision of 5 μm.

5. The drilling device of claim 4, wherein the clamp comprises a positioning clamp block arranged on the top of the support mechanism; a moving clamp block is fixed on the positioning clamp block through an adjusting bolt; the moving clamp block and the positioning clamp block are provided with slots, and the slots are oppositely arranged and stepwise distributed.

6. A drilling process with the controllable femtosecond laser processing taper based on the drilling device of claim 1, comprising:

activating the femtosecond laser to emit a beam;

expanding the beam through the beam expander to reach a required diameter for processing, wherein the beam enters the reflection mirror;

reflecting the beam to the beam scanning module through the reflection mirror to generate a spiral beam under an action of a displacement optical wedge group and a deflection optical wedge group, wherein the spiral beam enters a semi-transmissive reflection mirror through a semi-focusing mirror to generate a reflected beam, and the reflected beam enters the high-precision three-dimensional on-line monitoring module under an action of the semi-transmissive reflection mirror;

using the reflected beam transmitted through the semi-transmissive reflection mirror to perform laser drilling for a sample fixed on the clamp;

performing detection in real time through the high-precision three-dimensional on-line monitoring module; and adjusting an error generated in a processing procedure to improve a processing precision, wherein the beam scanning module comprises a displacement optical wedge group and a deflection optical wedge group;

wherein, the displacement optical wedge group comprises a first displacement optical wedge and a second displacement optical wedge, and the first displacement optical wedge and the second displacement optical wedge have an identical wedge angle and are linked through an vertical linear motion mechanism;

wherein, the deflection optical wedge group comprises a first deflection optical wedge and a second deflection optical wedge, and the first deflection optical wedge and the second deflection optical wedge have an identical wedge angle and are equidistantly distributed on both sides of the displacement optical wedge group through a rotating mechanism.

7. The drilling process of claim 6, wherein the femtosecond laser has a center wavelength of an optical pulse approaching to 1053 nm and a pulse width of 20 fs.

8. The drilling process of claim 6, wherein the beam scanning module adopts a fully closed loop control to control a deflection angle at a precision less than and equal to 0.1 degrees.

9. The drilling process of claim 6, wherein the precision motion table is a five-axis motion table, and the precision motion table has a positioning precision of 0.01 mm and a repeated positioning precision of 5 μm.

10. The drilling process of claim 6, wherein the clamp comprises a positioning clamp block arranged on the top of the support mechanism; a moving clamp block is fixed on the positioning clamp block through an adjusting bolt; the moving clamp block and the positioning clamp block are provided with slots, and the slots are oppositely arranged and stepwise distributed.

* * * * *